Aug. 25, 1964 W. C. HIGBEE 3,145,983

SPRING CALIBRATING MEANS

Filed Nov. 6, 1961

INVENTOR.
WALLACE C. HIGBEE
BY
Walter Potoroka, Sr.
ATTORNEY

United States Patent Office 3,145,983
Patented Aug. 25, 1964

3,145,983
SPRING CALIBRATING MEANS
Wallace C. Higbee, Mount Clemens, Mich., assignor to Holley Carburetor Company, Warren, Mich., a corporation of Michigan
Filed Nov. 6, 1961, Ser. No. 150,355
4 Claims. (Cl. 267—1)

This invention relates generally to coil springs, and more specifically to calibration devices for such springs.

There are many instances where it is desirable to change the rate of a spring, and calibrators, either fabricated from sheet metal or machined from bar stock, have been known and used for some time. All of the various types of calibrators currently in use function in the same manner, i.e., simply by screwing the calibrator on or further into the coils of the spring, the number of active coils can be changed. In other words, as is well known in the art, a reduction in the number of active coils will result in a higher spring rate; an increase in the number of active coils will result in a lower spring rate.

While calibrators used to date have performed satisfactorily, it has been found that they do have an inherent disadvantage. That is, although all of these units are readily adjustable, they have not been able to maintain an adjustment. Due to vibration and continual compression and retraction of the spring, for example, there is a tendency after prolonged usage for the typical calibrator to loosen. Since springs having such calibrators are often located in areas which are not readily accessible or are simply forgotten about, a particular apparatus may become continually less efficient when, in many instances, a high degree of precision is extremely important.

Accordingly, an object of this invention is to provide a locking feature in conjunction with a calibrator and spring assembly.

Another object of this invention is to provide such a mechanism which combines the qualities of compactness, simplicity and positive locking.

These and other advantages will become more apparent when reference is made to the following written description and the accompanying drawings wherein.

Figure 1:
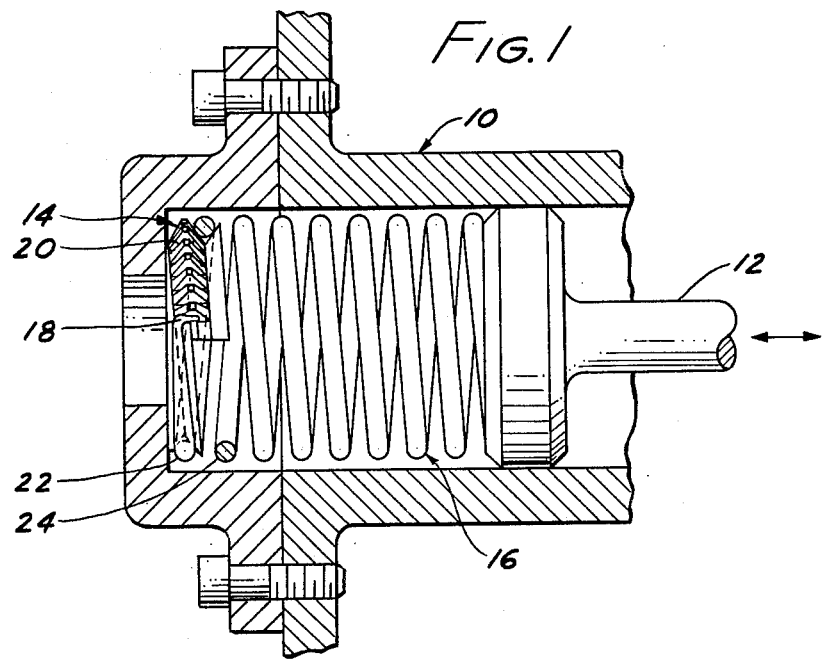
FIGURE 1 is a fragmentary side elevational view, with portions thereof cut away, of a mechanism including a spring and calibrator assembly embodying the invention.

Referring now to the drawings in greater detail, FIGURE 1 illustrates any imaginable mechanism including a fixed member 10 associated with some movable member 12 between which it is necessary to have a spring force. The mechanism involved would, of course, be one wherein the spring rate would be of extreme importance; that is, it would be vital to peak performance to employ a spring whose calibration could be readily and finitely adjusted.

As was stated above, springs and calibrators have been used in the past in similar instances. The exact adjustment was made by rotating calibrator 14, which comprises an annular body having a helical thread formed at the outer periphery thereof, further into or out of a mating helical coil spring 16. However, there was no assurance that the calibrator might not later lose that precise adjustment.

Figure 2:
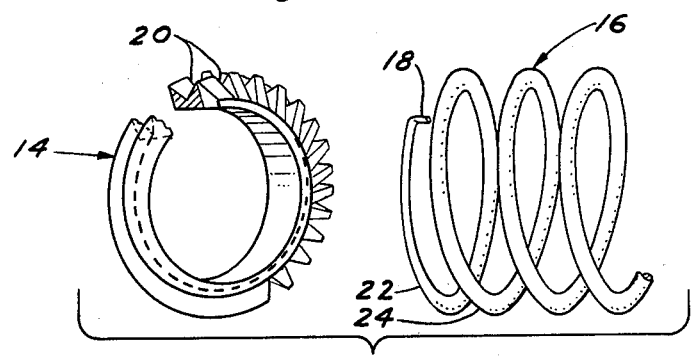
FIGURE 2 is a perspective view of the spring and calibrator shown by FIGURE 1, as seen just prior to their being assembled.
Figure 3:
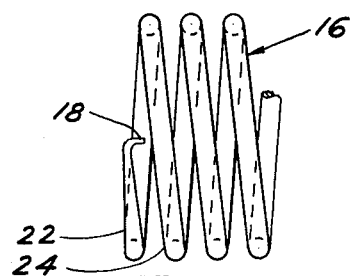
FIGURE 3 is a side elevational view of the spring shown by FIGURES 1 and 2.

As already stated, an object of this invention is to provide means for insuring that the precise initial calibration is not lost, despite vibrations and other conditions to which the spring and calibrator assembly may be subjected. As can be visualized from FIGURE 1, after the desired relationship between the calibrator 14 and the spring 16 is attained, i.e., the resultant spring rate is exactly as required, locking tab 18 of spring 16 can be snapped into one of the slots 20 located on the periphery of calibrator 14 and extending axially across the threads. These slots can be seen more clearly in FIGURE 2. Since the flattened end coil 22 of spring 16 would have been closed against the adjacent coil 24 before the tab 18 was formed, there is always a lateral spring force in coil 22 holding the tab 18 in the slot 20.

The mechanics of performing the adjustment of the invention are slightly different from the procedure employed in the heretofore conventional calibrator and spring. Adjustment inwardly to increase the spring rate is accomplished by holding the tab 18 out of the slots 20, as with the thumbnail, and threading the calibrator 14 into the spring 16 to the desired location. To "back out" the calibrator 14, thus producing a weaker spring rate, it is merely necessary to simultaneously hold out the tab 18 and thread the calibrator out of the spring 16. In either case, when the calibrator is properly positioned, the tab 18 is merely released so that it is engaged or received in the closest slot 20, thereby locking the calibrator with respect to the spring.

It can be seen that the procedure for arriving at a desired calibration is a relatively simple one that can be accomplished just as quickly as with present calibrators that do not have the locking feature of the invention. Also, it can be appreciated that the locking is positive, even though the devices employed are as simple in construction as any prior calibrator without such a locking feature.

While but one embodiment of the invention has been disclosed and descrbed, it is apparent that other modifications of the invention are possible within the scope of the appended claims.

What I claim as my invention is:

1. The combination of a uniform diameter helical coil spring, said spring having one free end thereof bent to form an axially extending tab, a calibrator member comprising an annular body having external threads receiving the coils of said spring and threadable in and out of said spring, said calibrator member having axially disposed slots formed across said threads, said slots being of sufficient width to receive said tab on said spring so as to maintain a predetermined angular relation of said calibrator with respect to said spring when one of said slots receives said tab.

2. A spring system comprising:
   (a) a coil spring having a locking tab on one end thereof and
   (b) a calibrator having a series of notches around the periphery thereof, said calibrator being rotatable in said coil spring and locked in place by the extension of said tab into any one of said series of notches.

3. A spring system comprising:
(a) a uniform diameter coil spring having one end closed and flattened and a locking tab formed on said one end, and
(b) a notched calibrator comprising an externally threaded body rotatable in said one end and locked in place by the extension of said tab into one of said notches.

4. A precision spring system comprising in combination:
(a) a uniform diameter coil spring containing one closed end, said closed end being flattened and having a locking tab formed on said one end, and
(b) a calibrator comprising an externally threaded body, said body being rotatable in said one end and having a plurality of longitudinal slots around a portion of the periphery thereof, one of said slots receiving said locking tab.

References Cited in the file of this patent

UNITED STATES PATENTS

| | | |
|---|---|---|
| 548,085 | Palmer | Oct. 15, 1895 |
| 1,000,645 | Nieuwkerk et al. | Aug. 15, 1911 |
| 1,644,783 | Lissel | Oct. 11, 1927 |
| 1,695,454 | Coyne | Dec. 18, 1928 |
| 2,814,827 | Snow | Dec. 3, 1957 |

FOREIGN PATENTS

| | | |
|---|---|---|
| 127,799 | Great Britain | June 12, 1919 |
| 508,977 | Great Britain | July 10, 1939 |